(12) United States Patent
Cain et al.

(10) Patent No.: US 7,793,049 B2
(45) Date of Patent: Sep. 7, 2010

(54) MECHANISM FOR DATA CACHE REPLACEMENT BASED ON REGION POLICIES

(75) Inventors: Harold W. Cain, Hartsdale, NY (US); Jong-Deok Choi, Seongnam (KR); Pratak Pattnaik, Ossining, NY (US); Mauricio J. Serrano, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 386 days.

(21) Appl. No.: 11/929,771

(22) Filed: Oct. 30, 2007

(65) Prior Publication Data

US 2009/0113135 A1    Apr. 30, 2009

(51) Int. Cl.
*G06F 12/00*    (2006.01)
(52) U.S. Cl. ........................ 711/133; 711/145
(58) Field of Classification Search ............... None
See application file for complete search history.

(56) References Cited

U.S. PATENT DOCUMENTS

| | | |
|---|---|---|
| 6,681,295 B1 | 1/2004 | Root |
| 6,748,492 B1 | 6/2004 | Rowlands |
| 6,766,419 B1 | 7/2004 | Zahir |
| 6,772,291 B2 | 8/2004 | Palanca |
| 6,829,679 B2 | 12/2004 | DeSota et al. |
| 6,965,962 B2 | 11/2005 | Sheaffer |
| 7,099,998 B1 | 8/2006 | Berkovits |
| 7,133,971 B2 | 11/2006 | Matick |
| 7,552,284 B2 * | 6/2009 | Petev et al. ............. 711/130 |
| 2001/0001873 A1 | 5/2001 | Wickeraad |
| 2002/0007441 A1 | 1/2002 | Palanca |
| 2005/0188158 A1 | 8/2005 | Schubert |
| 2006/0036811 A1 | 2/2006 | Dieffenderfer |
| 2006/0101208 A1 | 5/2006 | Kottapalli |
| 2006/0230235 A1 | 10/2006 | O'Connor |

* cited by examiner

*Primary Examiner*—Jack A Lane
(74) *Attorney, Agent, or Firm*—Michael J. Buchenhorner; Derek S. Jennings

(57) ABSTRACT

A system and method for cache replacement includes: augmenting each cache block in a cache region with a region hint indicating a temporal priority of the cache block; receiving an indication that a cache miss has occurred; and selecting for eviction the cache block comprising the region hint indicating a low temporal priority.

18 Claims, 3 Drawing Sheets

200

220

MECHANISM FOR DATA CACHE REPLACEMENT BASED ON REGION POLICIES

CROSS-REFERENCE TO RELATED APPLICATIONS

None.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of cache memory and more particularly relates to the field of data cache replacement policies.

BACKGROUND OF THE INVENTION

Modern computer systems employ cache memories in addition to main memory. The access latency of cache memory is significantly less than the access latency of main memory. One type of these cache memories retains recently accessed data, in the presumption that this data will be accessed again in the future. Memory operations performed by a processor will access this cache memory first. In the event that the accessed data is not found in the cache (termed a cache miss), the processor must wait for an extended period of time while that data is loaded into the cache from a slower or more remote memory. Processor stalls caused by this wait period comprise the majority of execution time for many applications.

Cache memories are logically organized as multiple sets of cache blocks. When a cache miss occurs, the set in which the new block is placed is first examined; if that set is full, room must be created for the new block by evicting one of the currently residing blocks from the set. This block selected for eviction is termed the victim. There has been much prior work described in the literature on determining the best choice of victim, such that the miss rate to the cache will be minimized. Examples of such cache block replacement policies include least-recently used (LRU) and first-in-first out (FIFO). These replacement policies have been designed to minimize the frequency of misses to the cache.

Modern languages such as Java™ or C# employ garbage collection techniques to manage memory allocation for objects. Such memory management techniques segregate allocated objects by regions, with different characteristics. For example, many programs tend to exhibit a high-rate of short-lived object allocations. Typically, only a small percentage of these allocated objects survive subsequent garbage collections. Objects that survive long-enough may be moved to another memory region.

Consequently, there are regions in memory which exhibit different reuse characteristics. The probability of reusing a cache line containing long-lived objects is typically higher. This is particularly true of generational garbage collectors, where there are separate regions for the newly allocated objects (nurseries) and long-lived objects (mature space). The concept of memory region can be applied to many other cases. For example, a region of memory could be the thread-local-heap memory (TLH), or a temporary allocation used by a thread; thus there could be multiple regions of memory at the same time.

There is a need for a cache replacement method to overcome the shortcomings of the known caches.

SUMMARY OF THE INVENTION

Briefly, according to an embodiment of the invention, a system and method for cache replacement includes: augmenting each cache block in a cache region with a region hint indicating a temporal priority of the cache block; receiving an indication that a cache miss has occurred; and selecting for eviction the cache block comprising the region hint indicating a low temporal priority.

BRIEF DESCRIPTION OF THE DRAWINGS

To describe the foregoing and other exemplary purposes, aspects, and advantages, we use the following detailed description of an exemplary embodiment of the invention with reference to the drawings, in which.

Figure 1:
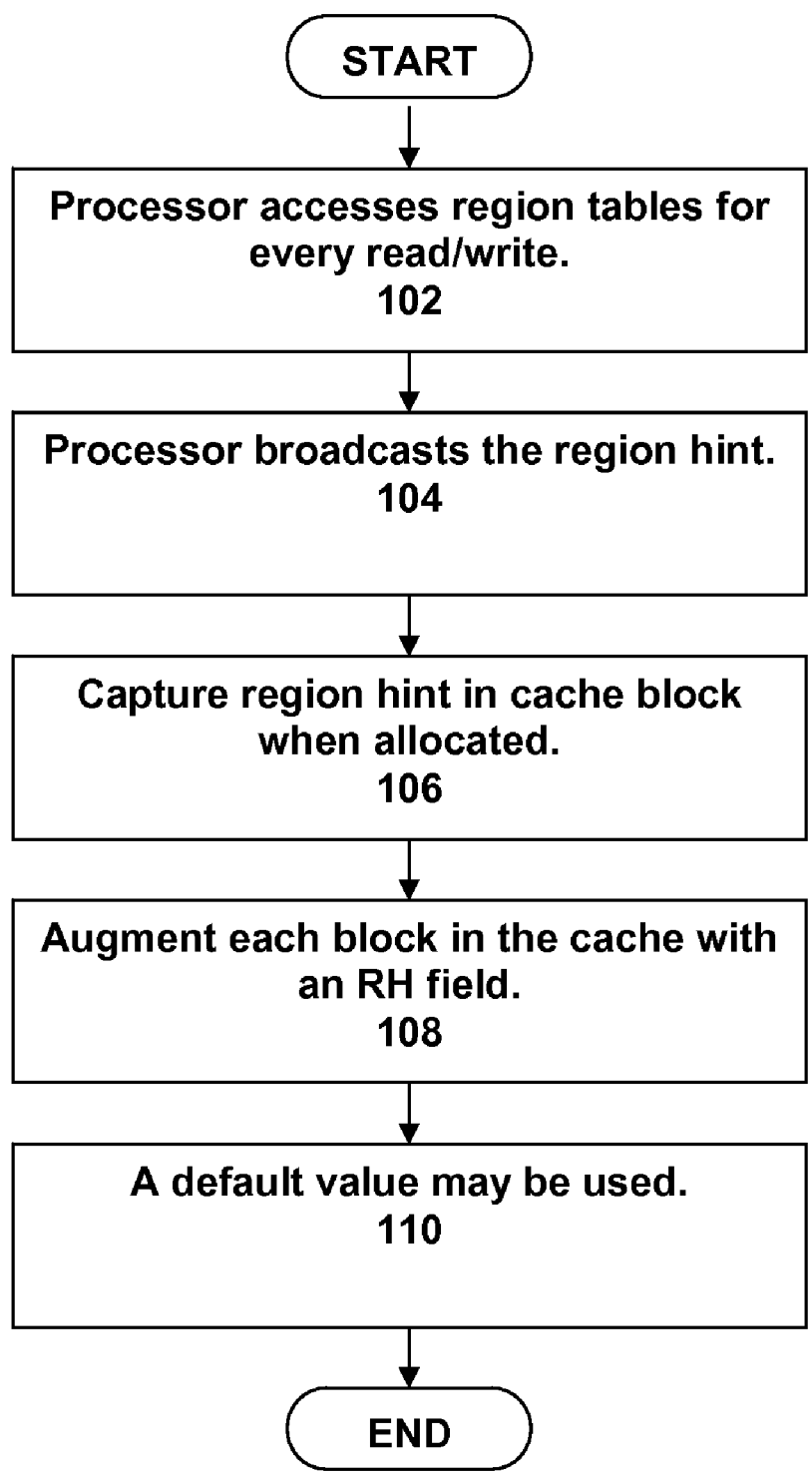
FIG. 1 is a flow chart of a method for tracking regions, according to an embodiment of the invention.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

We describe a combined software mechanism and hardware cache replacement mechanism that preferentially replaces cache blocks placed in regions less likely to be reused in the future, over those blocks placed in different regions which may be longer lived. This reduces the number of cache misses, resulting in a significant performance improvement. The software mechanism employs a cache replacement algorithm that uses hints generated by a running program regarding the potential for re-use of a cache block, based on semantics characteristics of the program. This information is tagged to the memory blocks so that the replacement algorithm refers to it when selecting a block for eviction.

Cache blocks are grouped logically, not physically. We assume that a runtime system can identify the memory regions with different temporal characteristics. A memory region could be given a low temporal priority if a cache block in this region is not likely to be reused in the near future, i.e. the reuse distance is large. Conversely, a memory region is given a high temporal priority if the reuse distance is small. This region hint (RH) indicating temporal priority may be encoded as a small N-bit integer, allowing 2**N temporal priorities.

Initially, a software runtime system identifies memory regions by their temporal characteristics. A conventional processor can be augmented with additional hardware to track regions. Several implementations are possible. A processor can have region tables associated with a particular process, each region entry containing information such as the start/end address of the region, and its associated RH priority. These tables are then saved/restored on a context switch.

The following embodiments use existing mechanisms for communicating regions from hardware to software:

a) applying region-based cache replacement policies to different parts of the heap in garbage collected languages;

b) a dynamic mechanism of combining a region-based replacement algorithm with a conventional LRU (least recently used) algorithm, using a stack threshold, which is an improvement on existing mechanisms; and c) a simplified version of (b) for instances where there is only one region block per cache set.

Using any of these embodiments, we are able to exploit behavior found in programs such as Java™ where objects created are dynamically classified into long-lived objects and short-lived objects. A variant of (a) is for the processor to access the region table only when there is a cache miss (not on every memory operation), and the region's temporal priority is written to the cache with the incoming cache block, as part of the block's metadata. Another variant of (a) is to merge the region hints with address translation tables such as existing ERAT (effective-to-real address table)/TLB (translation look-aside buffer) tables, which would limit regions to the particular granularity of the table.

Referring now in specific detail to the drawings, and particularly FIG. 1, there is illustrated a flow chart of a method 100 for tracking regions, according to an embodiment of the present invention. The method begins at step 102 where the processor accesses the region tables for every memory read/write.

In step 104, the processor then broadcasts the region hint to a particular cache level in the case of a cache miss at that level. In step 106 this hint can be captured in a cache block's information when the block is allocated. Consequently, in step 108 each block in the cache is augmented with a region hint (RH) field that can be used by the cache controller to make subsequent replacement decisions for the cache lines in a set in step. In the case that a region hint (RH) hint is not provided, a default value is used in step 110. An example of a default is to set all bits to zero.

Figure 2A:
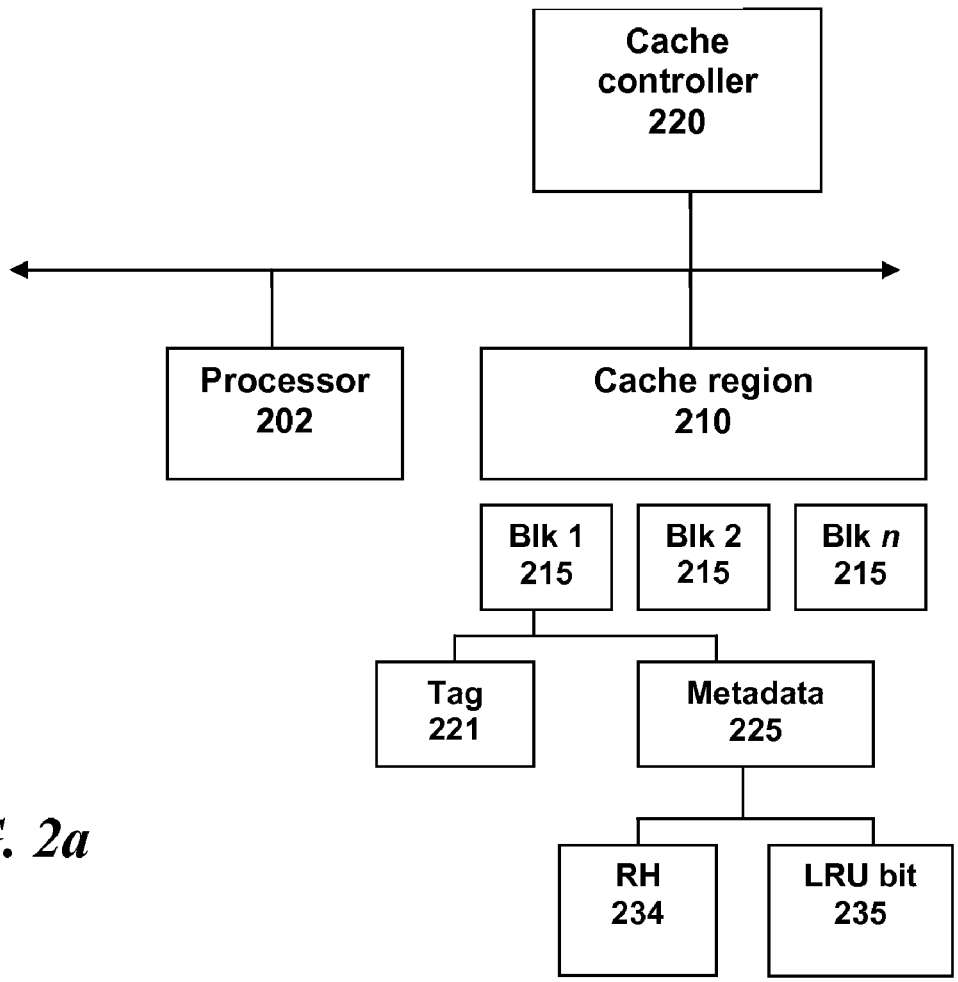
FIG. 2a is a simplified block diagram illustrating a system according to an embodiment of the invention.

Referring now to FIG. 2a, there is illustrated a cache management system 200 configured to operate according to an embodiment of the present invention. The system 200 is illustrated as a simplified information processing system with a processor 202 operatively connected with a cache controller 220. One can appreciate that other low-level components and connections are required in any practical application of a computer apparatus.

Cache memory 210 in this example is a set-associative cache encompassing multiple sets of data blocks 215. Each data block set has data blocks 215 (Blk1, Blk2, and Blkn). The number of sets and cache blocks within cache memory may vary by system. Each cache block 215 has a tag 221 identifier and metadata 225. The metadata 225 in a cache block 215 may contain cache data such as temporal priority RH 234, and an LRU bit 235.

A cache controller 220 handles access requests to the cache memory 210. A least recently used (LRU) stack 235 is associated with each set in the cache 210. The LRU stack 235 contains a register of the blocks 215 within the set, ordered by temporal history. Conventionally, the most recently used blocks are at the "top" of the stack 235 and the least recently used blocks are referenced at the "bottom" of the stack 235. An algorithm for selecting a block 215 for replacement is executed by the cache controller 220.

Figure 2B:
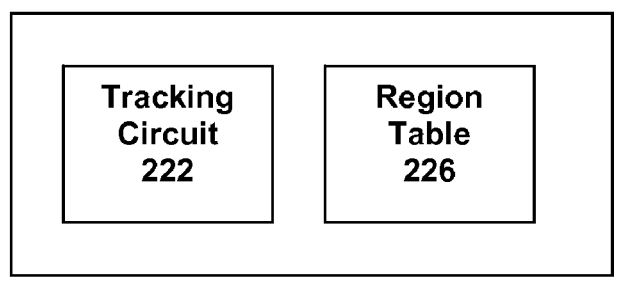
FIG. 2b is a block diagram illustrating optional components of a cache controller according to an embodiment of the present invention.

Referring to FIG. 2b, the cache controller 220 may include the following components: a) a tracking circuit 222 for tracking regions in the cache 210; and b) a region table 226 associated with a process. The region table 226 includes one or more region entries. Each entry contains information such as a start and end address for the region, and its associated temporal priority.

Figure 3:
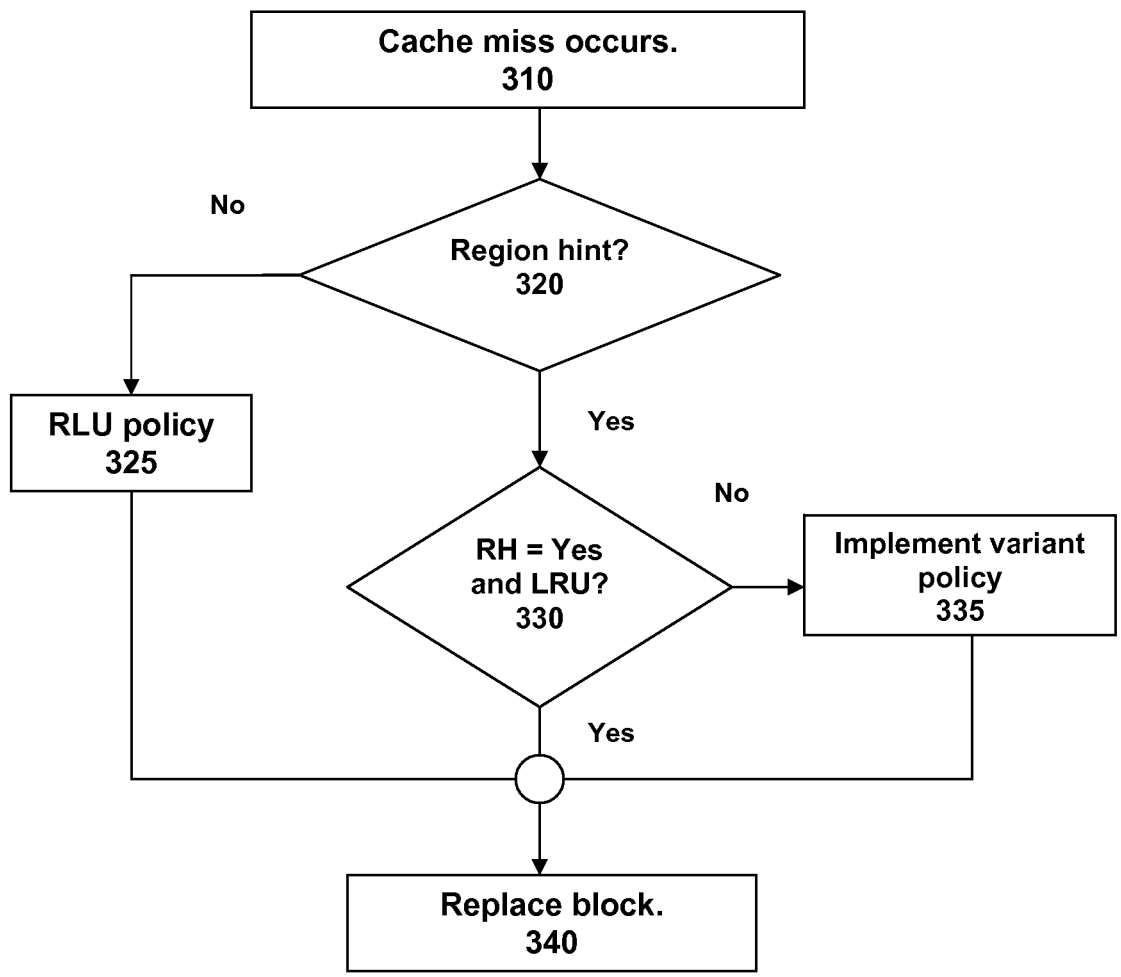
FIG. 3 is a flow chart of a modified cache replacement algorithm, according to an embodiment of the present invention.

Referring to FIG. 3, we describe the modified cache replacement algorithm, based on a LRU or equivalent policy, although it is not necessarily limited to such a policy. The goal of a replacement policy is to select a victim candidate cache line out of several cache lines possible for a particular congruence set. This victim line will be evicted and new information will be installed in this cache line. As described previously, each cache line contains a software region hint 234.

Upon receipt of cache miss in step 310, the controller 210 determines if there is a region hint in step 320. If it has a prediction of region hint 234 for a cache block 215, the modified replacement algorithm selects for replacement a block 215 that was least recently touched and whose region hint 234 makes it less likely to be used in step 330.

In the absence of a region hint, the replacement algorithm behaves as usual, selecting the least recently touched cache block in step 325. In step 340 that block is replaced. Notice that a region hint 234 does not necessarily mean that such blocks should be replaced immediately; doing so may result in an increase of cache misses for the set. Instead, the replacement policy considers both the LRU information of the cache line and the RH information for making an intelligent decision. For example, a cache controller 220 may use the region hints as follows:

The controller 220 considers only those blocks with lower RH priority (large reuse) and performs a conventional LRU mechanism among these blocks. If there are not blocks for that particular region priority, then the next priority region is considered, until a candidate for replacement is selected.

In step 335, a variant of the previous approach excludes some portion of the LRU 235 stack from this replacement decision, such that the most-recently-used cache blocks are not candidates for replacement. For example, if the cache associativity is eight, then only a portion of the eight potential replacement candidates could be considered for replacement, among the least recently used candidates. We call such a mechanism a stack threshold, because a threshold value is used to determine which portion of the LRU stack 235 should be included in the replacement decision.

An example of the proposed replacement policy is the following. Suppose that there are eight cache lines in a congruence class; this means that the cache is eight-way associative. Suppose that each cache line contains a number expressing the LRU position in the set and the region hint 234, expressed as a 1-bit (Yes/No). Lower LRU numbers mean that the cache line is less recently used.

| Cache Line | LRU | RH |
|---|---|---|
| 0 | 4 | No |
| 1 | 5 | Yes |
| 2 | 2 | Yes |
| 3 | 0 | No |
| 4 | 3 | No |

-continued

| Cache Line | LRU | RH |
|---|---|---|
| 5 | 6 | No |
| 6 | 1 | No |
| 7 | 7 | No |

Under a pure LRU policy, the next cache line to be evicted is 3, since it is the least recently used (LRU=0). However, when using the RH 234, the controller 220 may elect to evict line 2, because it is not very used and has the RH 234. The controller 220 could make the following decisions:

The controller 220 may decide to replace RH blocks only if they are rarely used. For example, it may select RH lines 1 and 2 and decide that they are not old enough because they are not in the ¼ portion of the least recently used lines. Thus, it may elect to evict line 3 instead.

If the controller's policy is to select lines with only RH replacement, then it could select line 2 because it is the least-recently used among the subset {1,2}. Alternatively, if the controller's policy is to use lines in the bottom one-half portion of the least recently used stack 235, it may also select line 2 because of its region hint 234 when compared to line 3.

An alternative simplified hardware implementation of the proposed replacement policy could be achieved if the probability of having only one RH cache line within a set is very high. This could be enforced by software allocation policies, for example:

Assuming that the software is aware of which allocation sites are likely to produce short-lived objects. In this scenario the software could enforce a sequential policy for such sites, such as the next cache line to be used in allocation belongs to the next set, and so on. Therefore, cache lines that are being used for allocation are mapped in a wrap-around fashion to different congruence sets in a cache 210, at least in virtual address space.

If the particular cache line is physically indexed, the use of large pages could guarantee that physical locations are mapped sequentially from virtual addresses. For example a 16-MByte large page could guarantee consecutive physical addresses for all cache lines within that page.

For generational garbage collectors, nursery allocation could be done sequentially. Under this simplified scheme, it is only needed to track the cache line within a set that could potentially contain a line allocated with the region hint 234. For example, four bits are required for each set in an eight-way associative cache, three of which point to the set containing the RH bit 234, and the fourth indicating that there is a cache line with the region hint 234. The controller 220 may elect to take the following actions:

Upon installing a new RH cache line in a set not already containing a RH line, set the four bits to point to the new cache line.

Upon installing a new RH cache line in a set already containing an RH line, evict that RH line if its LRU placement is very low (as explained before), or install the new RH line in the least recently position, therefore removing the region hint 234 from the old RH line.

Upon a cache miss without any region hint 234 for the new line, the controller 220 may elect to always evict any RH installed line pointed by the four bits (if any), or decide to clear the RH information if the RH line is not old enough.

Therefore, while there has been described what is presently considered to be the preferred embodiment, it will understood by those skilled in the art that other modifications can be made within the spirit of the invention. The above descriptions of embodiments are not intended to be exhaustive or limiting in scope. The embodiments, as described, were chosen in order to explain the principles of the invention, show its practical application, and enable those with ordinary skill in the art to understand how to make and use the invention. It should be understood that the invention is not limited to the embodiments described above, but rather should be interpreted within the full meaning and scope of the appended claims.

The invention claimed is:

1. A cache replacement method for a cache comprising a plurality of regions, each region comprising a plurality of cache blocks, the method comprising:
    applying region-based cache replacement policies to different parts of a heap in a generational garbage collection process comprising by:
        generating region tables associated with a particular process;
        augmenting each cache block in each cache region with a region hint indicating a temporal priority of the cache block for use by a cache controller in making replacement decisions; and
        for every incoming cache block, writing its corresponding region hint indicating the temporal priority as part of a metadata of said incoming cache block;
        accessing the region table only when there is a cache miss, not on every memory operation;
        selecting for eviction the cache block comprising the region hint indicating a low temporal priority; and
        mapping nursery regions to a lower temporal priority.

2. The cache replacement method of claim 1 wherein the region hint is generated by a running program at runtime.

3. The cache replacement method of claim 2 further comprising:
    initially generating the region hint when the cache block is populated.

4. The cache replacement method of claim 3 further comprising:
    storing the region tables.

5. The cache replacement method of claim 4 wherein each region table comprises:
    a start and an end address of each region; and
    the region hint.

6. The cache replacement method of claim 3 further comprising merging the region hint with an address translation table.

7. The cache replacement method of claim 1 further comprising receiving an indication that the cache miss has occurred which triggers access to the region table.

8. The cache replacement method of claim 1 further comprising integrating the region-based cache replacement policy with a least recently used policy.

9. The cache replacement method of claim 1 further comprising considering a position of the cache blocks relative to the least-used cache block.

10. A processor for controlling a cache region, the processor comprising:
    a tracking circuit for tracking regions in a cache, wherein each region comprises cache blocks of information; and
    a region table associated with a process, wherein the table comprises one or more region entries, and each entry contains information comprising a start and end address of the region, and its associated temporal priority, wherein the region table can be saved and restored when a context event occurs;

the processor being configured for applying region-based cache replacement policies to different parts of a heap in a generational garbage collector by:
augmenting each cache block in each region with a region hint indicating a temporal priority of the cache block for use by a cache controller in making replacement decisions;
for every incoming cache block, writing its corresponding region hint indicating the temporal priority as part of a metadata of said incoming cache block; and
mapping nursery regions to a lower temporal priority.

11. The processor of claim 10 wherein the processor accesses the region table for every memory read/write and passes the temporal priority to a next cache level in the case of a cache miss.

12. The processor of claim 10 further comprising receiving an indication of a cache miss, said indication of the cache miss triggering access to the region table.

13. A cache controller for controlling a cache comprising a plurality of regions, each region comprising a plurality of cache blocks, the cache controller comprising logic for:
applying region-based cache replacement policies to different parts of a heap in a generational garbage collector process by:
using a region table associated with a particular process, wherein said region table is accessed only when there is a cache miss, not on every memory operation;
checking a region hint indicating a temporal priority associated with a cache block, wherein said region hint is part of a metadata of the cache block;
selecting for replacement the cache block comprising the region hint indicating a low temporal priority; and
mapping nursery regions to a lower temporal priority.

14. The cache controller of claim 13 further comprising receiving an indication that a cache miss has occurred, said indication of the cache miss triggering access to the region table.

15. The cache controller of claim 13 wherein the cache block comprising the region hint indicating the low temporal priority has the lowest priority among all cache blocks.

16. The cache controller of claim 13 wherein when there is a plurality of cache blocks with the same temporal priority a least recently used method is implemented to select which cache block is to be replaced.

17. The cache controller of claim 13 wherein a portion of a least recently used stack is excluded from a replacement decision such that most recently used cache blocks are not candidates for replacement.

18. The cache controller of claim 13 wherein the logic for selecting the cache block for replacement is implemented when there is a high probability that only one cache block has the low temporal priority.

* * * * *